(12) United States Patent
Ise et al.

(10) Patent No.: US 8,614,856 B2
(45) Date of Patent: Dec. 24, 2013

(54) IMAGING LENS FOR SOLID-STATE IMAGING ELEMENT

(75) Inventors: Yoshio Ise, Sukagawa (JP); Masaya Hashimoto, Sukagawa (JP)

(73) Assignee: Kantatsu Co., Ltd., Tochigi (JP)

( * ) Notice: Subject to any disclaimer, the term of this patent is extended or adjusted under 35 U.S.C. 154(b) by 110 days.

(21) Appl. No.: 13/287,503

(22) Filed: Nov. 2, 2011

(65) Prior Publication Data

US 2012/0044583 A1 Feb. 23, 2012

Related U.S. Application Data

(63) Continuation of application No. PCT/JP2010/058707, filed on May 24, 2010.

(30) Foreign Application Priority Data

May 29, 2009 (JP) ................................. 2009-130571

(51) Int. Cl.
*G02B 13/18* (2006.01)
(52) U.S. Cl.
USPC ........................................................ 359/715
(58) Field of Classification Search
USPC ......... 359/644, 650, 660, 686–687, 715, 720, 359/747, 771–778
See application file for complete search history.

(56) References Cited

U.S. PATENT DOCUMENTS

| | | |
|---|---|---|
| 2007/0188890 A1 | 8/2007 | Jo et al. |
| 2008/0180816 A1 | 7/2008 | Nakamura |
| 2008/0239138 A1 | 10/2008 | Sano |
| 2009/0015944 A1* | 1/2009 | Taniyama ..................... 359/773 |

FOREIGN PATENT DOCUMENTS

| | | |
|---|---|---|
| JP | 2007-212877 A | 8/2007 |
| JP | 2007-219520 A | 8/2007 |
| JP | 2008-033376 A | 2/2008 |
| JP | 2008-185880 A | 8/2008 |
| JP | 2008-242180 A | 10/2008 |
| JP | 3146436 U | 11/2008 |
| JP | 2009-014899 A | 1/2009 |
| JP | 2009-047836 A | 3/2009 |
| JP | 2009-151113 A | 7/2009 |

OTHER PUBLICATIONS

International Search Report of PCT/JP2010/058707, mailing date Jun. 15, 2010.

* cited by examiner

*Primary Examiner* — Scott J Sugarman
*Assistant Examiner* — Vipin Patel
(74) *Attorney, Agent, or Firm* — Westerman, Hattori, Daniels & Adrian, LLP

(57) ABSTRACT

An aperture stop, a first lens directing a convex surface toward an object near an optical axis and having positive refractive power, a second lens directing a concave surface toward an image near the optical axis and having negative refractive power, a meniscus-shaped third lens directing a convex surface toward the image near the optical axis and having positive refractive power, and a biconcave-shaped fourth lens directing concave surfaces toward the object and the image near the optical axis are arranged in this order from an object side of an imaging lens. The following Conditional Expressions (1) and (2) are satisfied.

$-0.95 < f2/f < -0.5$    Conditional Expression (1)

$-0.95 < f4/f < -0.35$    Conditional Expression (2)

where f is the composite focal length of the entire imaging lens system; f2 represents the focal length of the second lens; and f4 represents the focal length of the fourth lens.

9 Claims, 9 Drawing Sheets

US 8,614,856 B2

IMAGING LENS FOR SOLID-STATE IMAGING ELEMENT

CROSS REFERENCE TO RELATED APPLICATION

This application is a continuation of International application No. PCT/JP2010/058707, filed May 24, 2010, the contents of which are incorporated herein by reference.

The present application is based on and claims priority of Japanese patent application No. 2009-130571 filed on May 29, 2009, the entire contents of which are hereby incorporated by reference.

BACKGROUND OF THE INVENTION

1. Field of the Invention

The present invention relates to an imaging lens for solid-state imaging elements for use in small imaging devices for use in small, thin electronic apparatuses such as mobile terminals and PDAs (personal digital assistances).

2. Description of the Related Art

As the market for mobile terminals including an imaging device expands in recent years, a small, high-pixel-number, solid-state imaging element has been mounted on such imaging devices.

With such miniaturization and pixel number increase of imaging elements, imaging lenses have been required to achieve higher performance in resolution and image quality. Further, with their widespread use, imaging lenses have been required to be more low-cost.

To meet such high performance trend, imaging lenses including multiple lenses have been commonly used. In recent years, there have been proposed four-lens-structure imaging lenses that can achieve higher performance than two to three-lens-structure ones.

As such a four-lens-structure imaging lens, for example, Japanese Patent Laid-Open Publication No. 2008-33376 (Patent Document 1) discloses a high-performance-oriented imaging lens where an aperture stop, a first lens having positive refractive power, a second lens having negative refractive power, a third lens having positive refractive power, and a fourth lens having at least one aspherical surface are arranged in this order from the object side.

Japanese Patent Laid-Open Publication No. 2009-14899 (Patent Document 2) discloses an imaging lens that is intended to increase the performance by arranging an aperture stop, a biconvex first lens having positive refractive power, a meniscus-shaped second lens directing a convex surface toward an object and having negative refractive power, a meniscus-shaped third lens directing a convex surface toward an image and having positive refractive power, and a meniscus-shaped fourth lens directing a convex surface toward the object and having negative refractive power in this order from the object side of the imaging lens.

While the imaging lenses described in Patent Documents 1 and 2 are intended to increase the performance by employing a four-lens structure, they are insufficient to meet miniaturization and slimming down or correct aberrations.

SUMMARY OF THE INVENTION

The present invention has been made in view of the above-mentioned problem, and an object of the invention is to provide an imaging lens for solid-state imaging elements that has a short optical length and can be miniaturized and that can correct aberrations, increase the performance, and meet cost reduction.

An imaging lens for solid-state imaging elements according to aspect 1 is characterized in that the imaging lens includes a first lens directing a convex surface toward an object side near an optical axis and having positive refractive power; a second lens directing a concave surface toward an image side near the optical axis and having negative refractive power; a meniscus-shaped third lens directing a convex surface toward the image side near the optical axis and having positive refractive power; and a biconcave-shaped fourth lens directing concave surfaces toward the object side and the image side near the optical axis, that the first to fourth lenses are arranged in this order from an object side of the imaging lens, and that conditional expressions (1) and (2) are satisfied, the conditional expressions (1) and (2) being $-0.95 < f2/f < -0.5$ and $-0.95 < f4/f < -0.35$, respectively, where f is the composite focal length of the entire imaging lens system; f2 represents the focal length of the second lens; and f4 represents the focal length of the fourth lens.

The above-mentioned conditional expression (1) defines the focal length range of the second lens relative to the focal length of the entire system. Falling below the lower limit of the conditional expression (1) excessively increases the focal length of the second lens, making it difficult to correct axial chromatic aberration. Exceeding the upper limit by contrast makes it difficult to correct spherical aberration and coma aberration.

The above-mentioned conditional expression (2) defines the focal length range of the fourth lens relative to the focal length of the entire system. Falling below the lower limit of the conditional expression (2) increases the focal length of the fourth lens, failing to reduce the optical length. This is disadvantageous in miniaturizing and slimming down the imaging lens. Exceeding the upper limit by contrast makes it difficult to secure off-axis performance, as well as degrades the error sensitivity characteristic at a location where the image height is small.

The imaging lens for solid-state imaging elements according to aspect 2 is characterized in that an aperture stop is disposed on an object side of the first lens.

Disposing the aperture stop so that it is closer to the object than the first lens facilitates a reduction in CRA (chief ray angle). This makes it easy to secure the light amount on the periphery of the image surface, where the light amount is small.

The imaging lens for solid-state imaging elements according to aspect 3 is characterized in that the object side surface of the fourth lens has a uniformly deformed, aspherical shape having no inflection point between the center of the lens and the periphery thereof.

By forming the object side surface of the fourth lens into a uniformly deformed, aspherical shape having no inflection point, manufacture with higher surface accuracy is possible. An inflection point refers to a point on an aspherical surface where the sign of the curvature radius is changed from negative to positive (or positive to negative).

The imaging lens for solid-state imaging elements according to aspect 4 is characterized in that the image side surface of the fourth lens has an aspherical shape having at least one inflection point between the center of the lens and the periphery thereof.

By forming the image side surface of the fourth lens into an aspherical shape having at least one inflection point between the center of the lens and the periphery thereof, it is possible to secure off-axis performance and CRA.

The imaging lens for solid-state imaging elements according to aspect 5 is characterized in that the fourth lens satisfies a conditional expression (3) with respect to the curvature radii of an object side thereof and an image side thereof, the conditional expression (3) being $-0.2<r8/r7<0.0$ where r7 represents the curvature radius of the object side surface of the fourth lens; and r8 represents the curvature radius of the image side surface thereof.

The conditional expression (3) defines the lens shape of the fourth lens. Falling below the lower limit of the conditional expression (3) excessively strengthens the negative power of the object side surface of the fourth lens. This throws the axial performance and the off-axis performance off balance, making it difficult to secure performance. Exceeding the upper limit by contrast forms the fourth lens into a meniscus shape, coming close to the existing lens structure. This is different from the intent of the present invention.

The imaging lens for solid-state imaging elements according to aspect 6 is characterized in that the first and third lenses satisfy conditional expressions (4) and (5), respectively, the conditional expressions (4) and (5) being $0.4<f1/f<0.68$ and $0.4<f3/f<0.85$, respectively, where f is the composite focal length of the entire imaging lens system; f1 represents the focal length of the first lens; and f3 represents the focal length of the third lens.

The conditional expression (4) defines the focal length range of the first lens relative to the focal length of the entire system. Falling below the lower limit of the conditional expression (4) excessively reduces the focal length of the first lens. This makes it difficult to correct spherical aberration and coma aberration. Exceeding the upper limit by contrast increases the optical length.

The conditional expression (5) defines the focal length range of the third lens relative to the focal length of the entire system. Falling below the lower limit of the conditional expression (5) excessively reduces the focal length of the third lens, making it difficult to correct coma aberration and astigmatism. This increases the error sensitivity, requiring extremely high accuracy during manufacture. Exceeding the upper limit by contrast causes a shortage of the power of the third lens, causing insufficient off-axis aberration correction.

The imaging lens for solid-state imaging elements according to aspect 7 is characterized in that the first, second and third lenses satisfy conditional expressions (6) and (7), the conditional expressions (6) and (7) being $-0.8<f1/f2<-0.6$ and $-0.9<f3/f2<-0.4$, respectively, where f1 represents the focal length of the first lens; f2 represents the focal length of the second lens; and f3 represents the focal length of the third lens.

The above-mentioned conditional expression (6) defines the ratio between the respective focal lengths of the first lens and the second lens. Falling below the lower limit of the conditional expression (6) excessively reduces the focal length of the second lens, making it difficult to correct aberrations. Exceeding the upper limit by contrast excessively increases the focal length of the second lens, causing insufficient correction of axial chromatic aberration and chromatic aberration of magnification.

The conditional expression (7) defines the ratio between the respective focal lengths of the third lens and the second lens. Falling below the lower limit of the conditional expression (7) excessively increases the focal length of the third lens, causing insufficient off-axis aberration correction. Exceeding the upper limit by contrast excessively reduces the focal length of the third lens, making it difficult to correct coma aberration and astigmatism.

The imaging lens for solid-state imaging elements according to aspect 8 is characterized in that the second lens has the shape of a biconcave lens directing concave surfaces toward the object side and the image side and that the curvature radius of the second lens satisfies a conditional expression (8), the conditional expression (8) being $-0.3<r4/r3<0.0$ where r3 represents the curvature radius of the object side surface of the second lens; and r4 represents the curvature radius of the image side surface thereof.

The conditional expression (8) defines the lens shape of the second lens. Falling below the lower limit of the conditional expression (8) excessively strengthens the negative power of the object side surface of the second lens. This increases the error sensitivity of that surface, making the lens less productive. Exceeding the upper limit by contrast forms the second lens into a meniscus shape, coming close to the existing lens structure. This is different from the intent of the present invention.

The imaging lens for solid-state imaging elements according to aspect 9 is characterized in that a conditional expression (9) is satisfied with respect to the optical length and the focal length of the entire imaging lens system, the conditional expression (9) being $1.08<L/f<1.23$ where L represents the distance from the front surface of the first lens to the image surface; and f represents the composite focal length of the entire imaging lens system.

The conditional expression (9) defines the optical length relative to the focal length. Falling below the lower limit of the conditional expression (9) excessively reduces the optical length. This makes it difficult to correct aberrations, as well as excessively degrades the error sensitivity during manufacture. Exceeding the upper limit by contrast excessively increases the optical length, preventing slimming down of the imaging lens.

The imaging lens for solid-state imaging elements according to aspect 10 is characterized in that the first, second, third and fourth lenses are so-called plastic lenses each having at least one aspherical surface and formed using a resin material.

The formation of the first, second, third and fourth lenses using a low-cost resin material with high production efficiency can reduce the cost. Further, the use of the aspherical surface can increase the performance.

The imaging lens for solid-state imaging elements according to aspect 11 is characterized in that the object side surface of the second lens has at least one point having a tangent plane perpendicular to the optical axis.

Since, in the four-lens structure, the fourth lens is provided with a telecentric characteristic and a point having a tangent plane perpendicular to the optical axis is formed on the object side surface of the second lens, aberrations such as coma aberration and astigmatism can be suppressed. A point having a tangent plane perpendicular to the optical axis refers to a point on an aspherical surface having a tangent plane perpendicular to the optical axis.

DETAILED DESCRIPTION OF THE PREFERRED EMBODIMENTS

Hereafter, embodiments of the present invention will be described while showing specific values. First to fourth embodiments are configured so that an aperture stop S, a first lens L1, a second lens L2, a third lens L3, a fourth lens L4, a parallel plane glass IR, and an image surface are arranged in this order from the object side.

Assuming that the apex of a surface is the origin; the Z axis is used as the optical axis direction; and h represents the height in a direction perpendicular to the optical axis, the aspherical shape of each embodiment is represented by the following aspherical surface formula.

$$Z = (h^2/r)/[1+\{1-(1+K)(h^2/r^2)\}^{1/2}] A_4 h^4 + A_6 h^6 + A_8 h^8 + \ldots$$

The characters used in the aspherical surface formula and the embodiments are as follows.

- $A_i$: i-th order aspherical coefficient
- r: curvature radius
- K: conic coefficient
- f: the focal length of the entire imaging lens system
- F: f-number
- d: axial surface distance
- nd: the refractive index of the lens material to the d-line
- ν: the Abbe's number of the lens material In the following description (including lens data in Tables), a power of 10 (e.g., $4.5 \times 10^{-04}$) is represented by E (e.g., 4.5E-04), and the surface numbers in lens data are sequentially assigned while defining the object side surface of the first lens as a first surface.

First Embodiment

Figure 1:
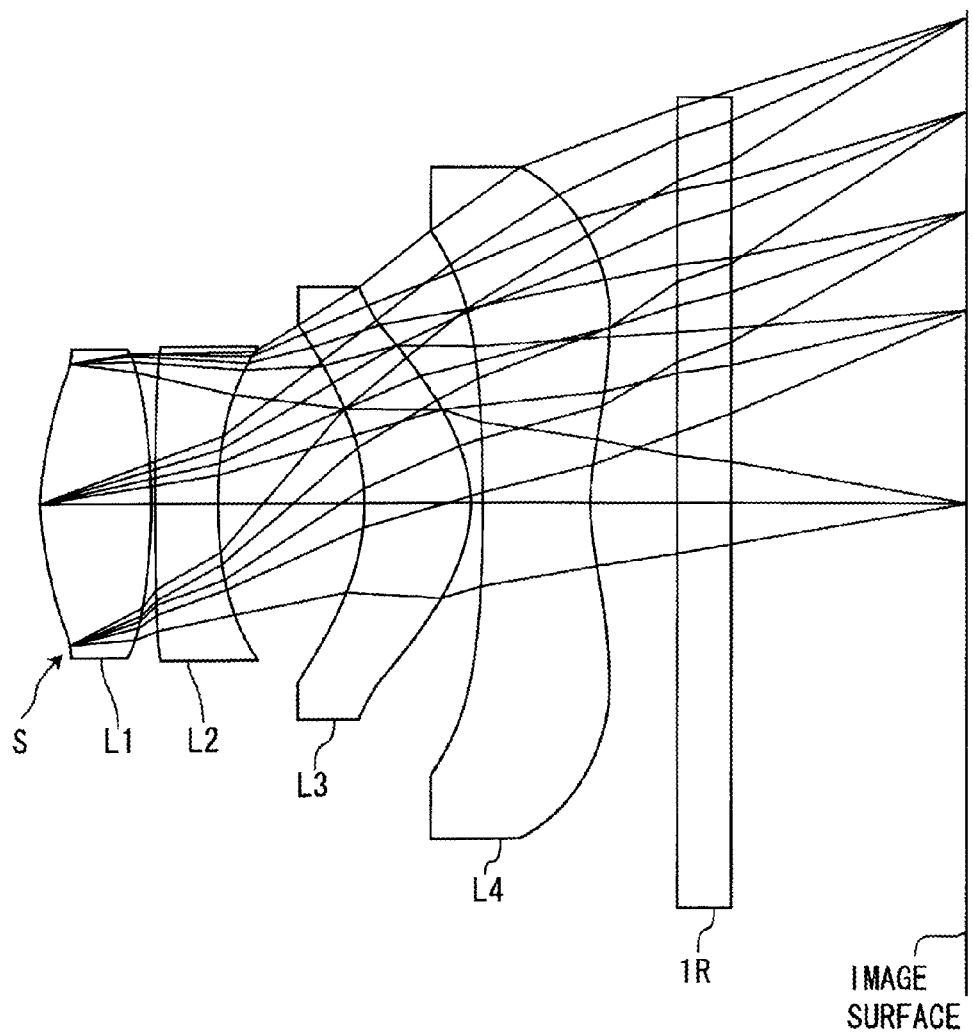
FIG. 1 is a sectional view of an imaging lens according to a first embodiment.
Figure 2:
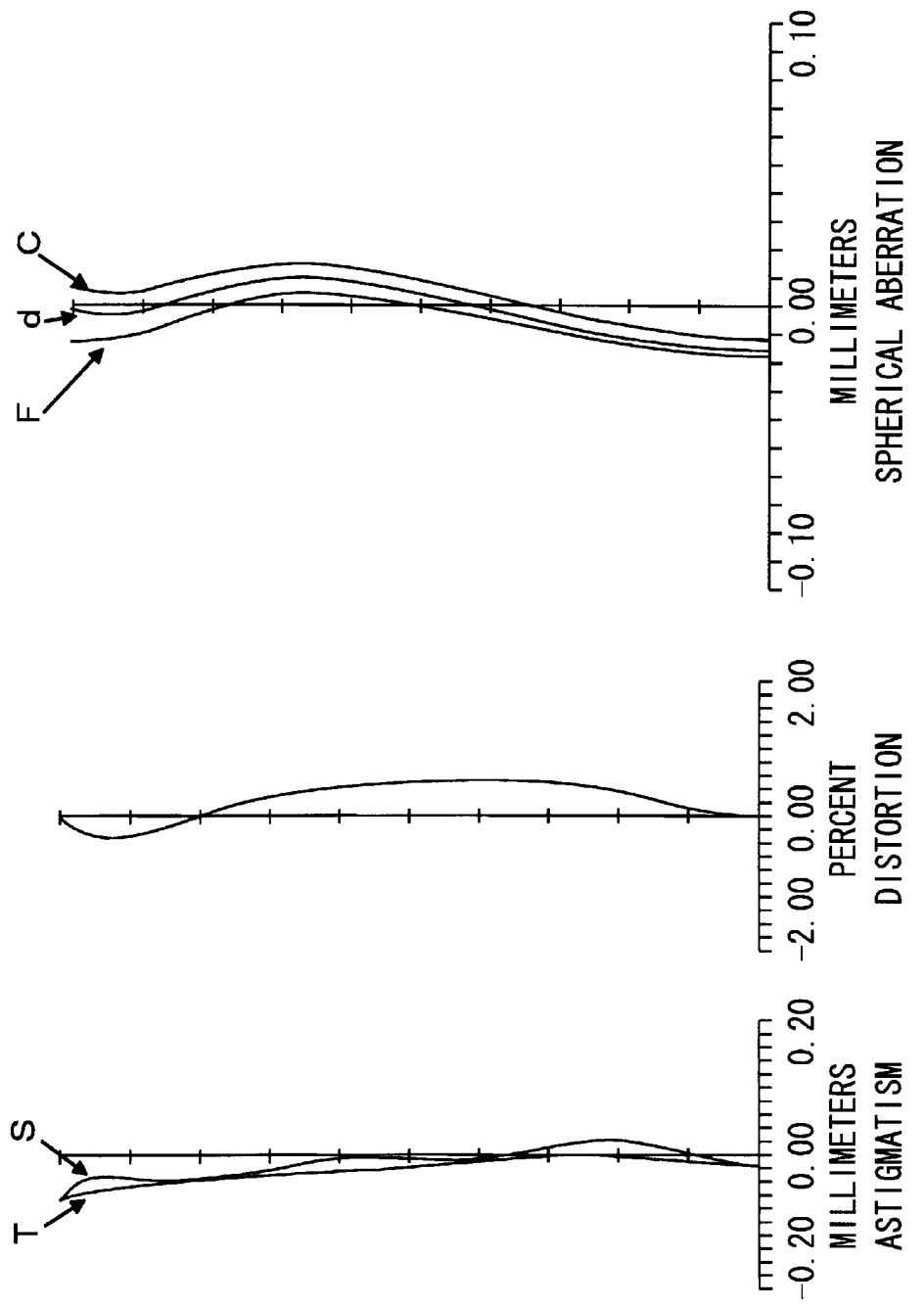
FIG. 2 includes graphs showing an aberration of the imaging lens according to the first embodiment.

Numerical data about an imaging lens according to a first embodiment is shown in Table 1. FIG. 1 is a sectional view of the imaging lens. FIG. 2 includes graphs showing an aberration.

TABLE 1

| | | | | |
|---|---|---|---|---|
| f = 4.559 F = 2.8 | | | | |

| Surface number | r | d | nd | ν | K |
|---|---|---|---|---|---|
| 1 (S) | 1.744 | 0.632 | 1.5247 | 56.2 | −0.037 |
| 2 | −4.299 | 0.031 | | | 0.698 |
| 3 | −181.071 | 0.350 | 1.6142 | 25.6 | 15510 |
| 4 | 2.333 | 0.850 | | | 0.098 |
| 5 | −1.434 | 0.614 | 1.5441 | 56.0 | 0.017 |
| 6 | −0.862 | 0.068 | | | −3.259 |
| 7 | −1677000 | 0.619 | 1.5247 | 56.2 | 7.069E+11 |
| 8 | 1.659 | 0.500 | | | −13.518 |
| 9 | ∞ | 0.300 | 1.5168 | 64.2 | |
| 10 | ∞ | 1.347 | | | |

| Surface number | A4 | A6 | A8 | A10 | A12 | A14 | A16 |
|---|---|---|---|---|---|---|---|
| 1 (S) | −0.02775 | −0.01855 | −0.05349 | 0.04010 | −0.06362 | | |
| 2 | 0.02256 | −0.06895 | −0.08736 | 0.12462 | −0.06803 | | |
| 3 | 0.05477 | −0.01015 | −0.06907 | 0.11275 | −0.03314 | | |
| 4 | 0.03851 | 0.04600 | −6.666E-3 | −2.719E-3 | 0.01068 | | |
| 5 | 8.349E-3 | −0.07570 | 0.15322 | −9.936E-3 | −0.02095 | | |
| 6 | −0.21165 | 0.13221 | −0.07350 | 0.05133 | −1.016E-3 | −5.183E-3 | |
| 7 | −0.07219 | −9.108E-3 | 0.04658 | −0.03486 | 0.01055 | −1.131E-3 | |
| 8 | −0.11130 | 0.05642 | −0.02885 | 0.01081 | −2.899E-3 | 4.632E-4 | −3.321E-5 |

Second Embodiment

Figure 3:
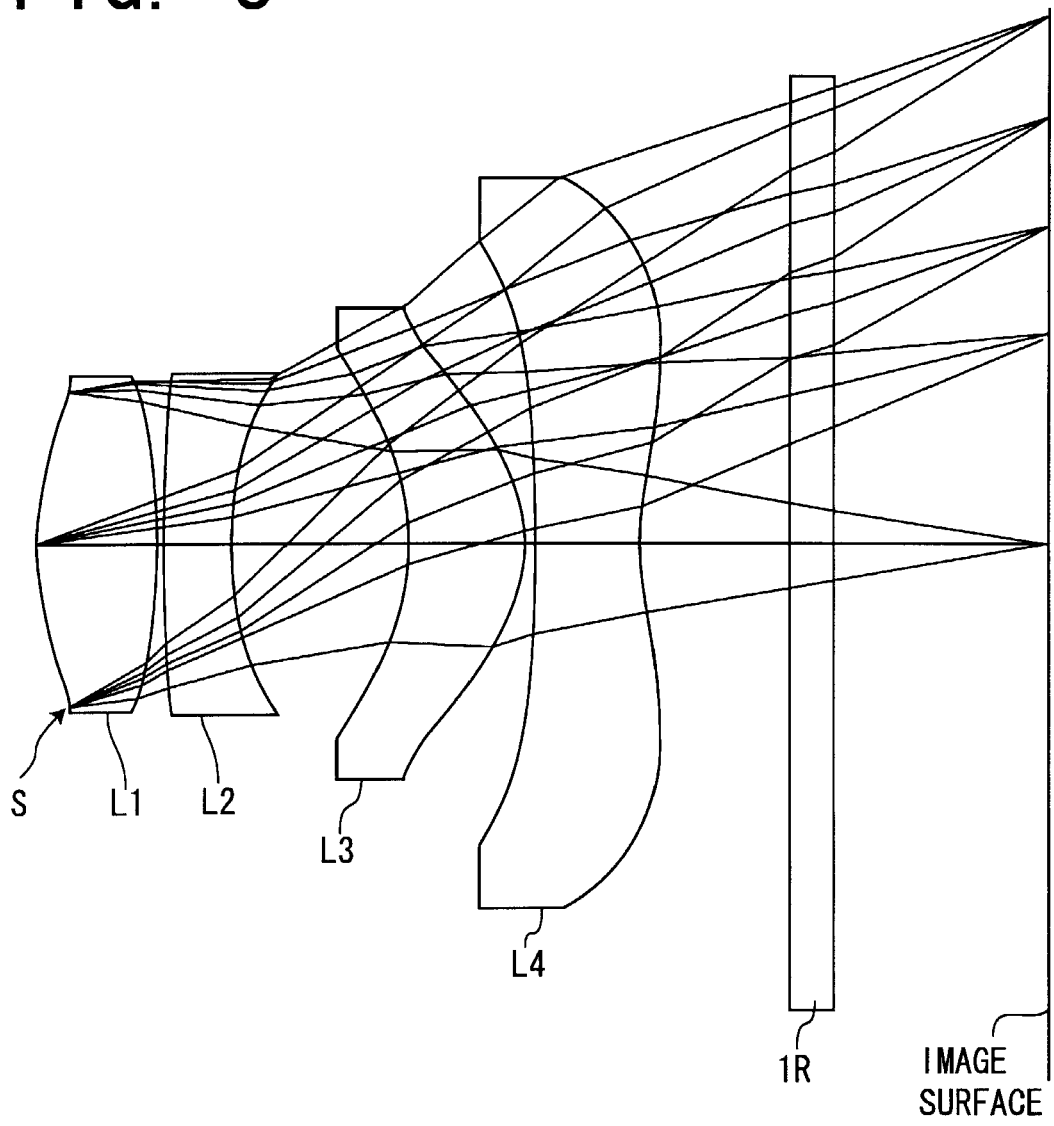
FIG. 3 is a sectional view of an imaging lens according to a second embodiment.
Figure 4:
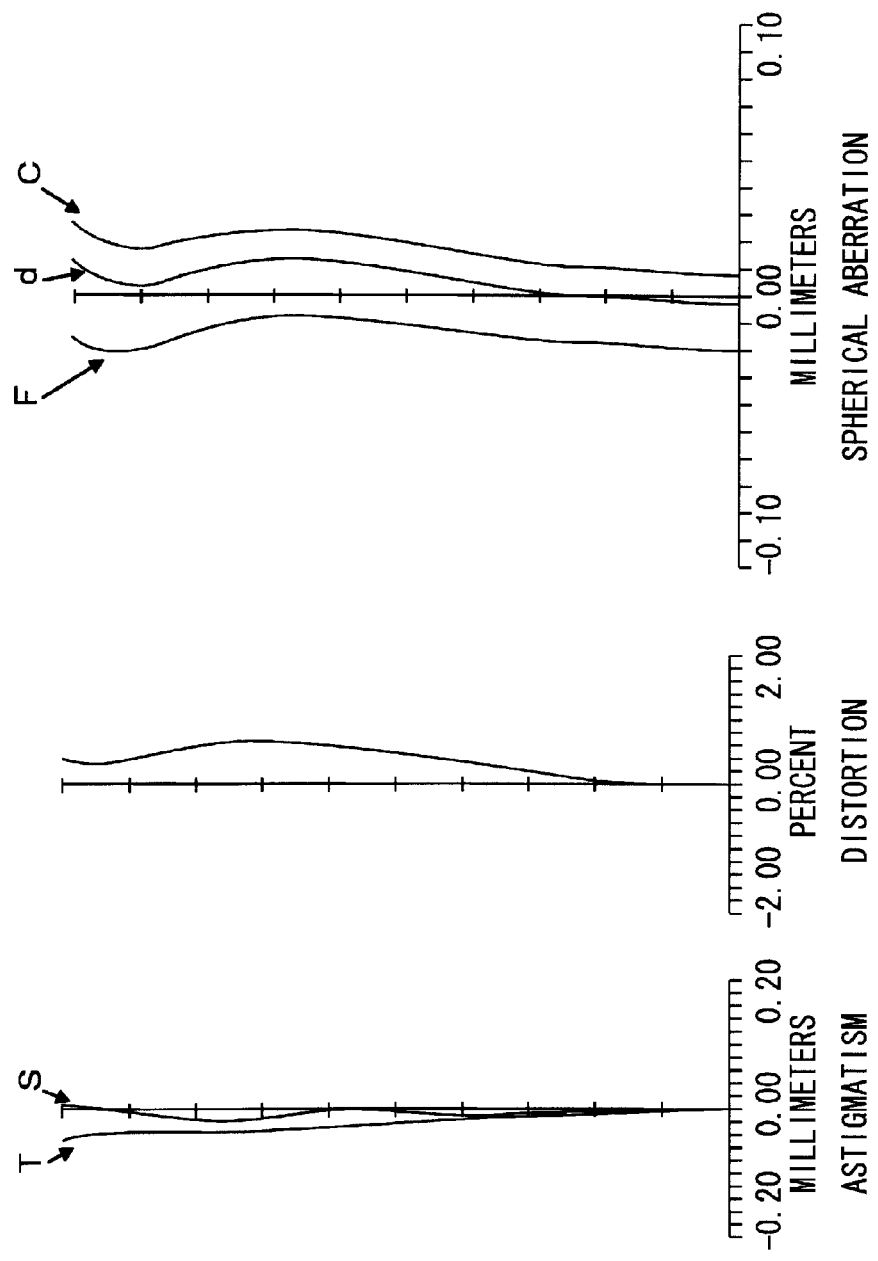
FIG. 4 includes graphs showing an aberration of the imaging lens according to the second embodiment.

Numerical data about an imaging lens according to a second embodiment is shown in Table 2. FIG. 3 is a sectional view of the imaging lens. FIG. 4 includes graphs showing an aberration.

TABLE 2

| | | | | |
|---|---|---|---|---|
| f = 4.715 F = 2.8 | | | | |

| Surface number | r | d | nd | ν | K |
|---|---|---|---|---|---|
| 1 (S) | 1.751 | 0.638 | 1.5247 | 56.2 | 7.672E-4 |
| 2 | −4.343 | 0.028 | | | 0.113 |
| 3 | −69.176 | 0.348 | 1.5850 | 30.0 | 78.473 |
| 4 | 2.296 | 0.946 | | | 0.082 |
| 5 | −1.489 | 0.623 | 1.5247 | 56.2 | 0.071 |
| 6 | −0.809 | 0.054 | | | −3.376 |
| 7 | −111.906 | 0.539 | 1.5247 | 56.2 | 462.062 |
| 8 | 1.424 | 0.800 | | | −13.394 |
| 9 | ∞ | 0.250 | 1.5168 | 64.2 | |
| 10 | ∞ | 1.098 | | | |

TABLE 2-continued

| | | | f = 4.715 F = 2.8 | | | | |
|---|---|---|---|---|---|---|---|
| Surface number | A4 | A6 | A8 | A10 | A12 | A14 | A16 |
| 1 (S) | −0.02658 | −0.02132 | −0.05304 | 0.04325 | −0.06171 | | |
| 2 | 0.02264 | −0.07042 | −0.08543 | 0.12558 | −0.06711 | | |
| 3 | 0.05510 | −9.749E−3 | −0.06911 | 0.11494 | −0.03661 | | |
| 4 | 0.03840 | 0.04700 | −5.850E−3 | −7.282E−3 | 0.01207 | | |
| 5 | −1.965E−4 | −0.08065 | 0.15360 | −8.792E−3 | −0.01893 | | |
| 6 | −0.21020 | 0.13252 | −0.07306 | 0.05169 | −8.685E−4 | −5.104E−3 | |
| 7 | −0.06881 | −8.981E−3 | 0.04674 | −0.03489 | 0.01055 | −1.130E−3 | |
| 8 | −0.10986 | 0.05672 | −0.02901 | 0.01082 | −2.898E−3 | 4.636E−4 | −3.347E−5 |

Third Embodiment

Figure 5:
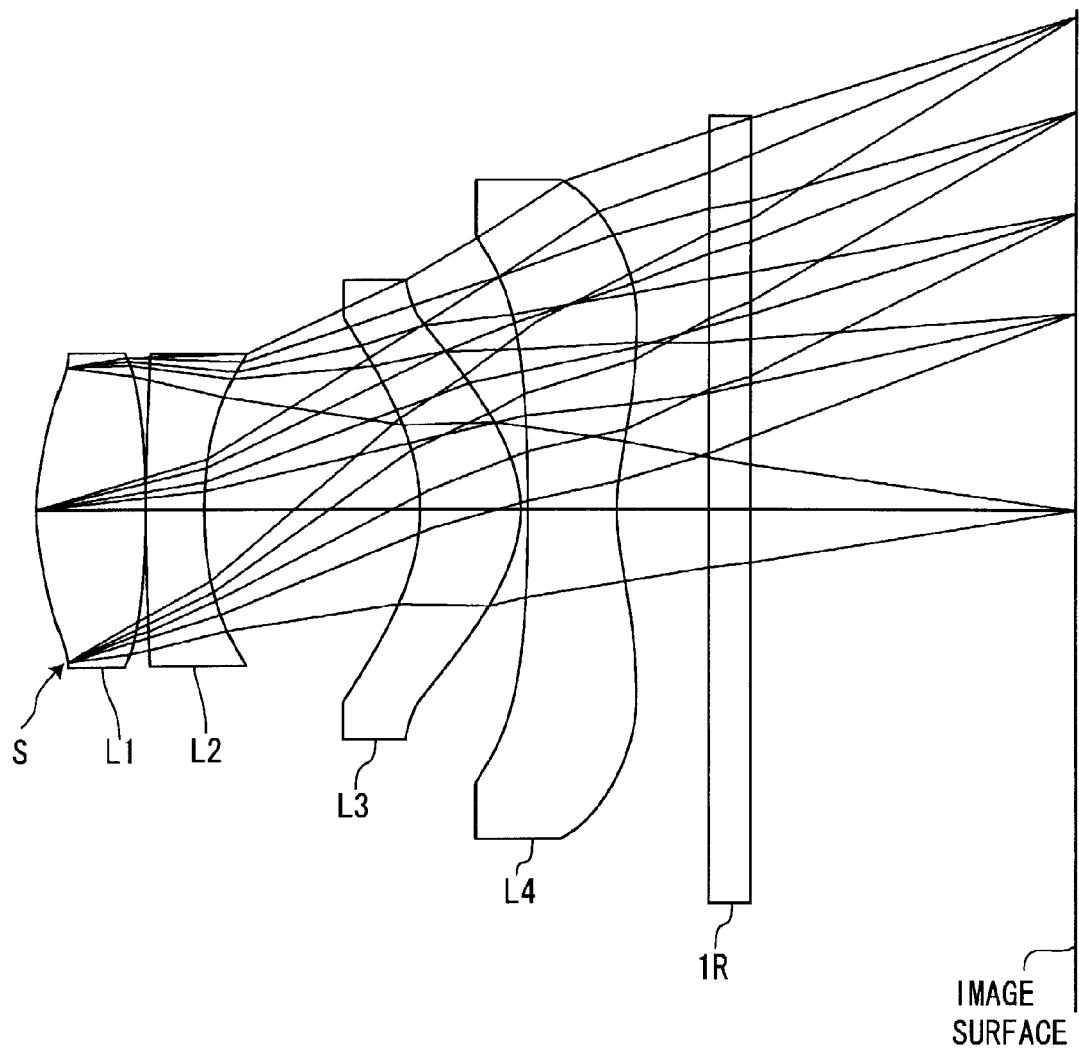
FIG. 5 is a sectional view of an imaging lens according to a third embodiment.
Figure 6:
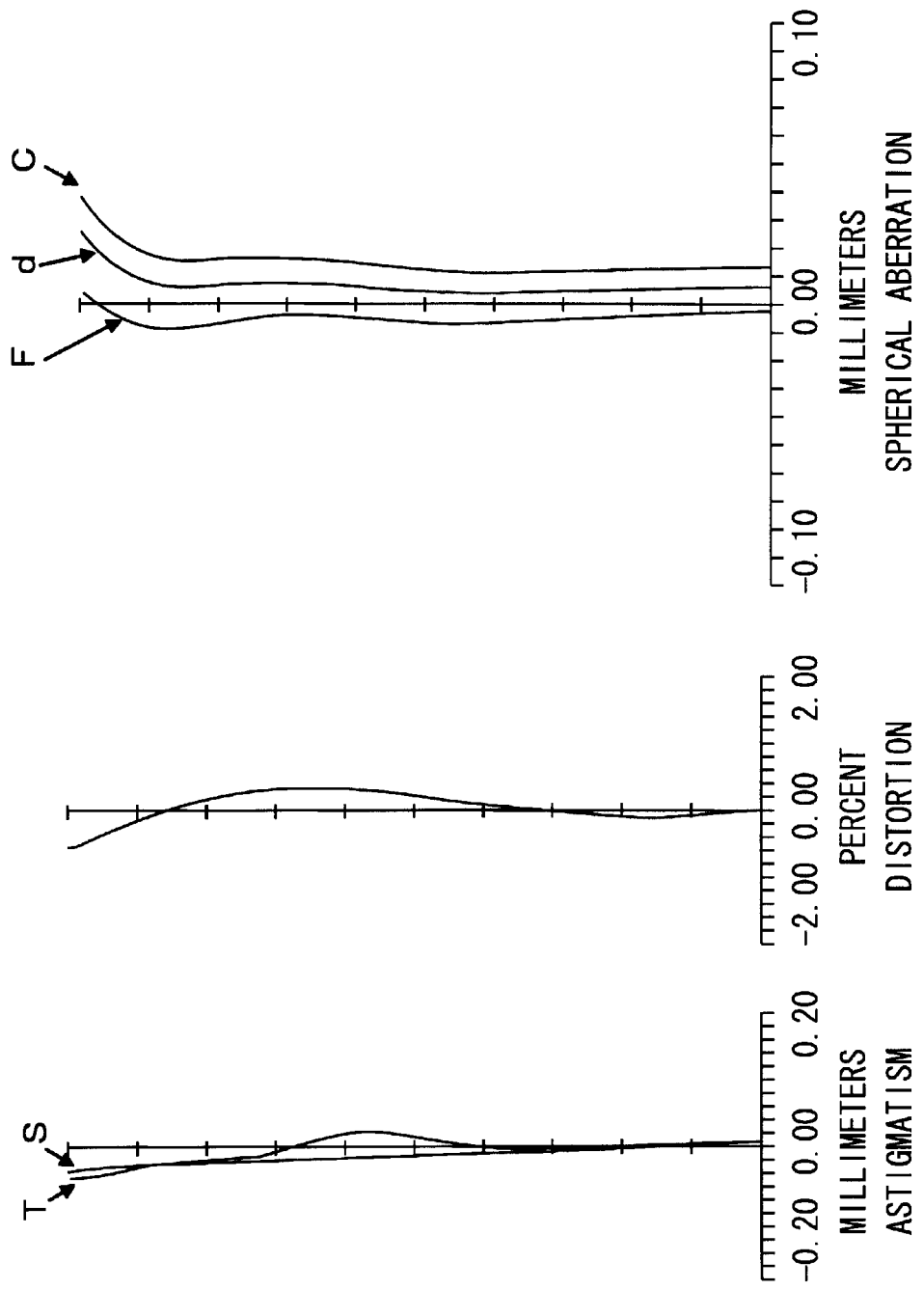
FIG. 6 includes graphs showing an aberration of the imaging lens according to the third embodiment.

Numerical data about an imaging lens according to a third embodiment is shown in Table 3. FIG. 5 is a sectional view of the imaging lens. FIG. 6 includes graphs showing an aberration.

Fourth Embodiment

Figure 7:
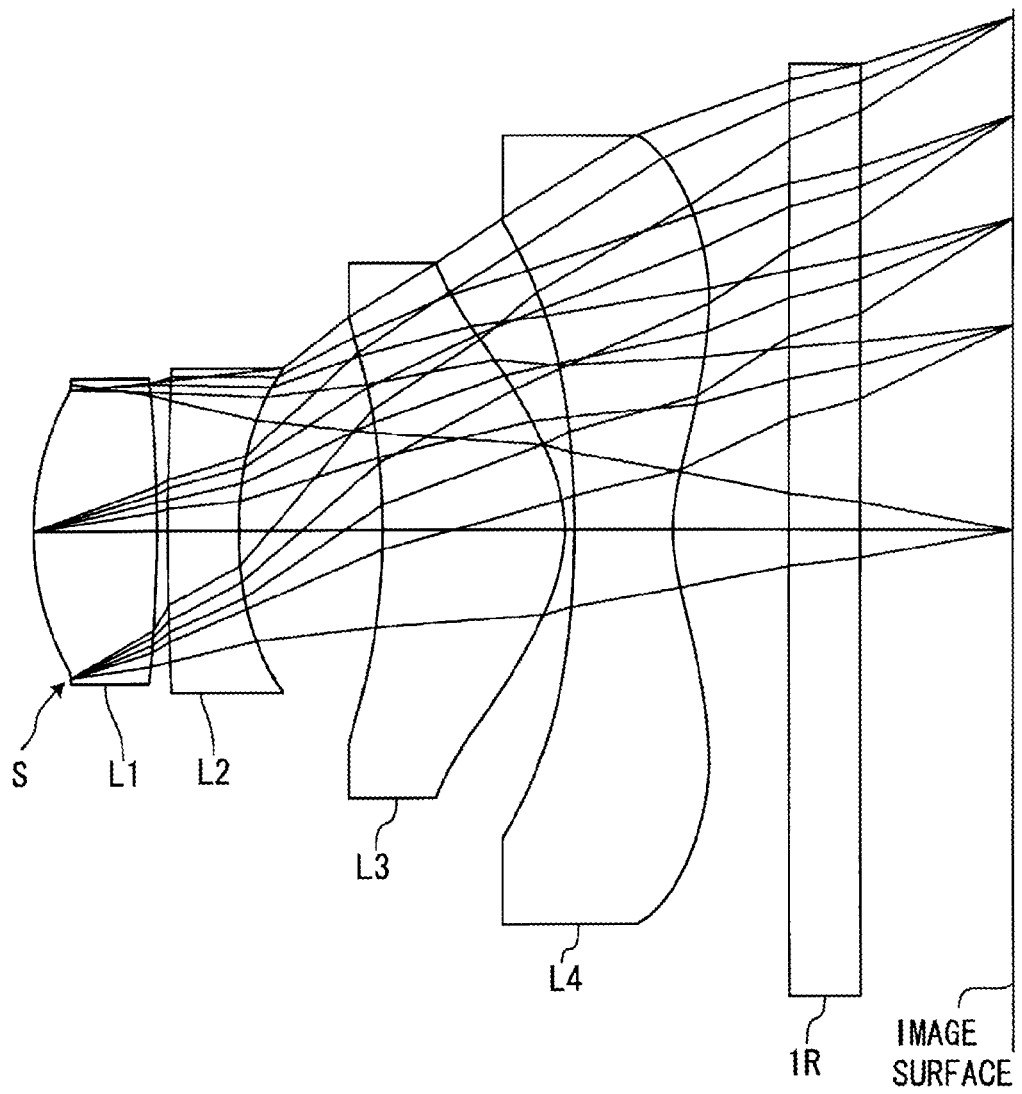
FIG. 7 is a sectional view of an imaging lens according to a fourth embodiment.
Figure 8:
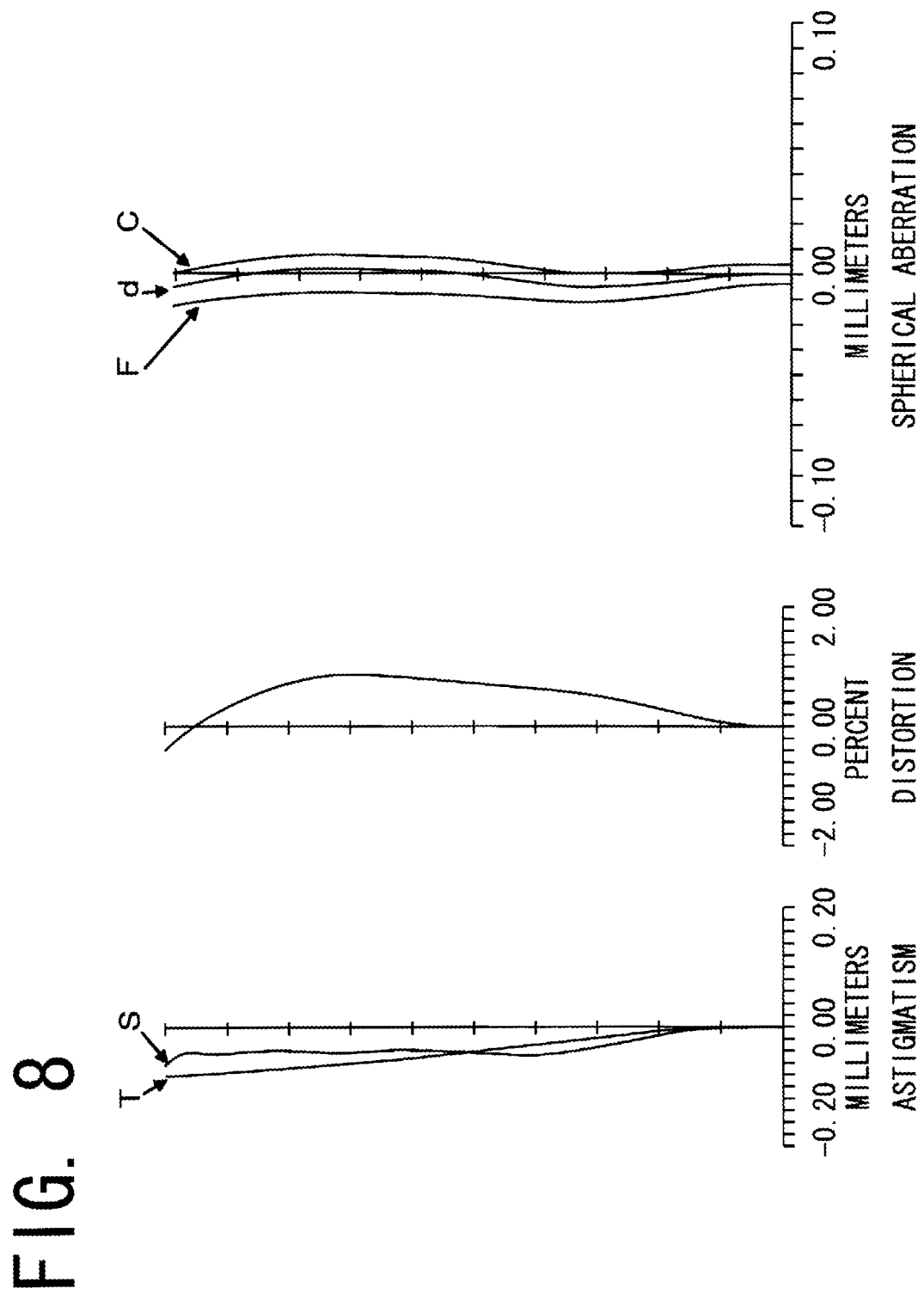
FIG. 8 includes graphs showing an aberration of the imaging lens according to the fourth embodiment.

Numerical data about an imaging lens according to a fourth embodiment is shown in Table 4. FIG. 7 is a sectional view of the imaging lens. FIG. 8 includes graphs showing an aberration.

TABLE 3

| | | f = 5.373 F = 3.2 | | | |
|---|---|---|---|---|---|
| Surface number | r | d | nd | ν | K |
| 1 (S) | 1.754 | 0.618 | 1.5247 | 56.2 | 0.019 |
| 2 | −4.308 | 0.007 | | | 0.284 |
| 3 | −34.167 | 0.314 | 1.5850 | 30.0 | 650.474 |
| 4 | 2.193 | 1.217 | | | −0.084 |
| 5 | −1.454 | 0.586 | 1.5441 | 56.0 | −0.014 |
| 6 | −0.820 | 0.041 | | | −3.466 |
| 7 | −84.390 | 0.508 | 1.5247 | 56.2 | 2760.668 |
| 8 | 1.462 | 0.500 | | | −14.674 |
| 9 | ∞ | 0.250 | 1.5168 | 64.2 | |
| 10 | ∞ | 1.824 | | | |

| Surface number | A4 | A6 | A8 | A10 | A12 | A14 | A16 |
|---|---|---|---|---|---|---|---|
| 1 (S) | −0.02624 | −0.01991 | −0.05342 | 0.04102 | −0.06604 | | |
| 2 | 0.02232 | −0.07083 | −0.08579 | 0.12518 | −0.06833 | | |
| 3 | 0.05470 | −9.925E−3 | −0.06939 | 0.11556 | −0.03433 | | |
| 4 | 0.03682 | 0.04946 | −3.139E−3 | −8.425E−3 | 4.379E−3 | | |
| 5 | 1.472E−3 | −0.08030 | 0.15297 | −9.551E−3 | −0.01929 | | |
| 6 | −0.21429 | 0.13081 | −0.07358 | 0.05150 | −9.681E−4 | −5.151E−3 | |
| 7 | −0.07052 | −8.678E−3 | 0.04689 | −0.03486 | 0.01055 | −1.137E−3 | |
| 8 | −0.11115 | 0.05720 | −0.02901 | 0.01081 | −2.899E−3 | 4.637E−4 | −3.328E−5 |

TABLE 4

| | | f = 3.523 F = 2.8 | | | |
|---|---|---|---|---|---|
| Surface number | r | d | nd | ν | K |
| 1 (S) | 1.328 | 0.520 | 1.5247 | 56.2 | −0.010 |
| 2 | −5.555 | 0.051 | | | −0.022 |
| 3 | −146.001 | 0.302 | 1.6142 | 25.6 | 14559.050 |
| 4 | 1.946 | 0.616 | | | −43.793 |
| 5 | −2.959 | 0.776 | 1.5247 | 56.2 | 0.393 |
| 6 | −0.734 | 0.044 | | | −4.280 |
| 7 | −36.017 | 0.416 | 1.5247 | 56.2 | −4923.003 |
| 8 | 0.891 | 0.500 | | | −8.204 |
| 9 | ∞ | 0.300 | 1.5168 | 64.2 | |
| 10 | ∞ | 0.643 | | | |

TABLE 4-continued f = 3.523 F = 2.8

| Surface number | A4 | A6 | A8 | A10 | A12 | A14 | A16 |
|---|---|---|---|---|---|---|---|
| 1 (S) | −0.04768 | 0.23709 | −0.95337 | 1.73425 | −1.46212 | | |
| 2 | 0.32481 | −1.65052 | 6.01768 | −14.4451 | 16.9735 | −7.75660 | |
| 3 | 0.41207 | −2.20252 | 9.19863 | −24.5170 | 34.1685 | −21.8616 | 4.64846 |
| 4 | 0.85984 | −2.87184 | 8.92026 | −17.5001 | 18.3429 | −7.02542 | −0.69484 |
| 5 | 0.12649 | −0.98175 | 3.44768 | −6.82053 | 8.07182 | −5.24933 | 1.42362 |
| 6 | −0.24510 | 0.11938 | 0.15507 | −0.29942 | 0.34187 | −0.20948 | 0.04787 |
| 7 | −0.29701 | 0.15811 | 0.17855 | −0.34994 | 0.25115 | −0.08815 | 0.01222 |
| 8 | −0.21997 | 0.19119 | −0.12942 | 0.05907 | −0.01802 | 3.305E−3 | −2.834E−4 |

Values corresponding to following Conditional Expressions (1) to (9) with respect to the first to fourth embodiments are shown in Table 5 below.

$-0.95 < f2/f < -0.5$     Conditional Expression (1)

$-0.95 < f4/f < -0.35$    Conditional Expression (2)

$-0.2 < r8/r7 < 0.0$      Conditional Expression (3)

$0.4 < f1/f < 0.68$       Conditional Expression (4)

$0.4 < f3/f < 0.85$       Conditional Expression (5)

$-0.8 < f1/f2 < -0.6$     Conditional Expression (6)

$-0.9 < f3/f2 < -0.4$     Conditional Expression (7)

$-0.3 < r4/r3 < 0.0$      Conditional Expression (8)

$1.08 < L/f < 1.23$       Conditional Expression (9)

where
f: the composite focal length of the entire imaging lens system
f1: the focal length of the first lens
f2: the focal length of the second lens
f3: the focal length of the third lens
f4: the focal length of the fourth lens
r3: the curvature radius of the object side surface of the second lens
r4: the curvature radius of the image side surface of the second lens
r7: the curvature radius of the object side surface of the fourth lens
r8: the curvature radius of the image side surface of the fourth lens
L: the distance from the front surface of the first lens to the image surface

TABLE 5

| | First embodiment | Second embodiment | Third embodiment | Fourth embodiment |
|---|---|---|---|---|
| Conditional expression (1) | −0.822 | −0.804 | −0.653 | −0.887 |
| Conditional expression (2) | −0.694 | −0.567 | −0.509 | −0.469 |
| Conditional expression (3) | −0.000 | −0.013 | −0.017 | −0.025 |
| Conditional expression (4) | 0.538 | 0.523 | 0.458 | 0.595 |
| Conditional expression (5) | 0.632 | 0.544 | 0.485 | 0.471 |
| Conditional expression (6) | −0.655 | −0.651 | −0.701 | −0.671 |
| Conditional expression (7) | −0.769 | −0.677 | −0.743 | −0.532 |
| Conditional expression (8) | −0.013 | −0.033 | −0.064 | −0.013 |
| Conditional expression (9) | 1.165 | 1.129 | 1.092 | 1.183 |

As shown in Table 5, the first to fourth embodiments according to the present invention satisfy the values corresponding to Conditional Expressions (1) to (9).

Specifically, the above-mentioned Conditional Expression (1) defines the focal length range of the second lens L2 relative to the focal length of the entire system. Falling below the lower limit (−0.95) of Conditional Expression (1) excessively increases the focal length of the second lens L2, makes the correction of axial chromatic aberration difficult. Exceeding the upper limit (−0.5) by contrast makes the correction of spherical aberration and coma aberration difficult, failing to obtain the desired optical performance in any case. Satisfying Conditional Expression (1) can keep the focal length of the second lens L2 short, as well as can favorably correct axial chromatic aberration, spherical aberration, and coma aberration.

The above-mentioned Conditional Expression (2) defines the focal length range of the fourth lens L4 relative to the focal length of the entire system. Falling below the lower limit (−0.95) of Conditional Expression (2) increases the focal length of the fourth lens L4, failing to reduce the optical length. This makes it difficult to miniaturize and slim down the imaging lens. Exceeding the upper limit (−0.35) by contrast makes it difficult to secure off-axis performance, as well as degrades the error sensitivity characteristic in a location where the image height is small. Satisfying Conditional Expression (2) can miniaturize and slim down the imaging lens, as well as can effectively increase the off-axis performance.

The above-mentioned Conditional Expression (3) defines the lens shape of the fourth lens L4. Falling below the lower limit (−0.2) of Conditional Expression (3) excessively strengthens the negative power of the object side surface of the fourth lens L4. This throws the axial performance and the off-axis performance off balance, making it difficult to secure performance. Exceeding the upper limit (0.0) by contrast forms the fourth lens L4 into a meniscus shape. Satisfying Conditional Expression (3) keeps the axial performance and the off-balance performance in balance, as well as increases the optical performance. Further, the four-lens structure can increases performance, as well as allows miniaturization and slimming down.

The above-mentioned Conditional Expression (4) defines the focal length range of the first lens L1 relative to the focal length of the entire system. Falling below the lower limit (0.4) of Conditional Expression (4) excessively reduces the focal length of the first lens L1, making it difficult to correct spherical aberration and coma aberration. Exceeding the upper limit (0.68) by contrast excessively increases the optical length. Satisfying Conditional Expression (4) can favorably correct spherical aberration and coma aberration, as well as can slim down the imaging lens.

The above-mentioned Conditional Expression (5) defines the focal length range of the third lens L3 relative to the focal length of the entire system. Falling below the lower limit (0.4) of Conditional Expression (5) excessively reduces the focal length of the third lens L3, making it difficult to correct coma aberration and astigmatism. Since the error sensitivity is increased, extremely high accuracy is required during manufacture. Exceeding the upper limit (0.85) by contrast causes a shortage of the power of the third lens L3, causing insufficient off-axis aberration correction. Satisfying Conditional Expression (5) can favorably correct coma aberration and astigmatism, as well as can fully exhibit the power of the third lens L3. Thus, the off-axis aberration is favorably corrected.

The above-mentioned Conditional Expression (6) defines the ratio between the respective focal lengths of the first lens L1 and the second lens L2. Falling below the lower limit (−0.8) of Conditional Expression (6) excessively reduces the focal length of the second lens L2, making it difficult to correct aberrations. In contrast, exceeding the upper limit (−0.6) excessively increases the focal length of the second lens L2, causing insufficient correction of axial chromatic aberration and chromatic aberration of magnification. Satisfying Conditional Expression (6) favorably corrects aberrations, that is, axial chromatic aberration and chromatic aberration of magnification.

The above-mentioned Conditional Expression (7) defines the ratio between the respective focal lengths of the third lens L3 and the second lens L2. Failing below the lower limit (−0.9) of Conditional Expression (7) excessively increases the focal length of the third lens L3, causing a shortage of off-axis aberration correction. Exceeding the upper limit (−0.4) by contrast excessively reduces the focal length of the third lens L3, making it difficult to correct coma aberration and astigmatism. Satisfying Conditional Expression (7) favorably corrects coma aberration and astigmatism.

The above-mentioned Conditional Expression (8) defines the lens shape of the second lens L2. Falling below the lower limit (−0.3) of Conditional Expression (8) excessively strengthens the negative power of the object side surface of the second lens L2. This degrades the error sensitivity of the surface, reducing the productivity of the lens. Exceeding the upper limit (0.0) by contrast forms the second lens L2 into a meniscus shape, coming close to the existing lens structure. Satisfying Conditional Expression (8) increases the productivity of the lens. Further, the four-lens structure can increase the performance, as well as allows miniaturization and slimming down.

The above-mentioned Conditional Expression (9) defines the optical length relative to the focal length. Falling below the lower limit (1.08) of Conditional Expression (9) excessively reduces the optical length. This makes it difficult to correct aberrations, as well as excessively degrades the error sensitivity during manufacture. Exceeding the upper limit (1.23) by contrast increases the optical length. Satisfying Conditional Expression (9) favorably corrects aberrations, as well as moderates the error sensitivity during manufacture. This can increase productivity, as well as can slim down the imaging lens.

Further, disposing the aperture stop S so that it is closer to the object side than the first lens L1 makes it easy to reduce CRA (chief ray angle). This makes it easy to secure the light amount on the periphery of the image surface, where the light amount is small.

Further, by forming the object side surface of the fourth lens L4 into a uniformly deformed, aspherical shape having no inflection point, manufacture with higher surface accuracy is possible.

Further, by forming the image side surface of the fourth lens L4 into an aspherical shape having at least one inflection point between the center of the lens and the periphery thereof, it is possible to secure off-axis performance and CRA.

Accordingly, by forming the first lens L1, the second lens L2, the third lens L3, and the fourth lens L4 using a low-cost resin material with high production efficiency, the cost can be reduced. Further, use of the aspherical surface can increase the performance. Further, by disposing the first lens L1 directing a convex surface toward the object near the optical axis and having positive refractive power, the second lens L2 directing a concave surface toward the image near the optical axis and having negative refractive power, the meniscus-shaped third lens L3 directing a convex surface toward the image near the optical axis and having positive refractive power, and the biconcave-shaped fourth lens L4 directing concave surfaces toward the object and the image near the optical axis, the lenses L1 to L4 each having at least one aspherical surface; and optimizing the distribution of the refractive power of the lenses L1 to L4, aberrations are favorably corrected. These can increase the performance of the lens, as well as can miniaturize the lens.

Figure 9:
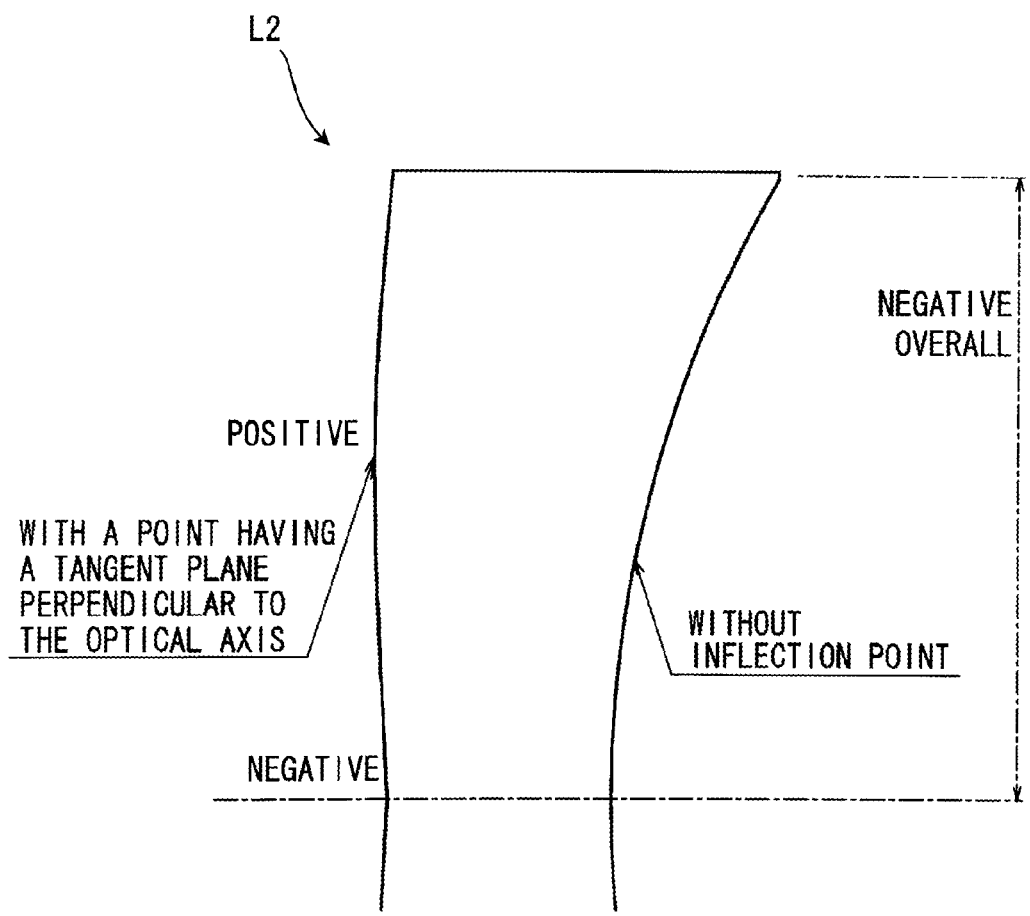
FIG. 9 is an enlarged explanation view of a main part of a second lens.

Further, in the four-lens structure, the fourth lens L4 is provided with a telecentric characteristic and a point having a tangent plane perpendicular to the optical axis is formed on the object side surface of the second lens L2, as shown in FIG. 9. These can suppress aberrations such as coma aberration and astigmatism.

While the embodiments of the present invention have been described in detail, the invention is not limited thereto. Various modifications can be made thereto without departing from the spirit and scope of the invention.

The effects of the present invention are as follows.

According to the present invention, the aperture stop is disposed most adjacent to the object side and a role that the existing three-lens structure does not have is provided for the fourth lens in the four-lens structure. This makes it easy to secure off-axis performance.

Further, by arranging the first lens directing a convex surface toward the object side near the optical axis and having positive refractive power, the second lens directing a concave surface toward the image side near the optical axis and having negative refractive power, the meniscus-shaped third lens directing a convex surface toward the image side near the optical axis and having positive refractive power, and the biconcave-shaped fourth lens directing concave surfaces toward the object side and the image side near the optical axis, the first to fourth lenses each having at least one aspherical surface; and optimizing the distribution of the refractive power of each lens, aberrations are favorably corrected. This can increase the performance of the lens, as well as can miniaturize the lens. Further, use of a resin material can reduce the cost.

What is claimed is:

1. An imaging lens for solid-state imaging elements, comprising:
    a first lens directing a convex surface toward an object side near an optical axis and having positive refractive power;
    a second lens directing concave surfaces toward the object side and an image side near the optical axis and having negative refractive power;
    a meniscus-shaped third lens directing a convex surface toward the image side near the optical axis and having positive refractive power; and
    a biconcave-shaped fourth lens directing concave surfaces toward the object side and the image side near the optical axis, wherein
    the first to fourth lenses are arranged in this order from the object side of the imaging lens, and
    conditional expressions (1), (2), (3), and (8) are satisfied, the conditional expressions (1), (2), (3), and (8) being $-0.95<f2/f<-0.5$, $-0.95<f4/f<-0.35$, $-0.025 \leq r8/r7<0.0$, and $-0.064 \leq r4/r3<0.0$ respectively, where f represents the composite focal length of the entire imaging lens system; f2 represents the focal length of the second lens; f4 represents the focal length of the fourth lens; r3 represents the curvature radius of the object side surface of the second lens; r4 represents the curvature radius of the image side surface of the second lens; r7 represents the curvature radius of the object side surface of the fourth lens; and r8 represents the curvature radius of the image side surface of the fourth lens.

2. The imaging lens according to claim 1, wherein an aperture stop is disposed on the object side of the first lens.

3. The imaging lens according to claim 1, wherein the object side surface of the fourth lens has a uniformly deformed, aspherical shape having no inflection point between the center of the lens and the periphery thereof.

4. The imaging lens according to claim 1, wherein the image side surface of the fourth lens has an aspherical shape having at least one inflection point between the center of the lens and the periphery thereof.

5. The imaging lens according to claim 1, wherein the first and third lenses satisfy conditional expressions (4) and (5), respectively, the conditional expressions (4) and (5) being $0.4<f1/f<0.68$ and $0.4<f3/f<0.85$, respectively, where f represents the composite focal length of the entire imaging lens system; f1 represents the focal length of the first lens; and f3 represents the focal length of the third lens.

6. The imaging lens according to claim 5, wherein the first, second and third lenses satisfy conditional expressions (6) and (7), the conditional expressions (6) and (7) being $-0.8<f1/f2<-0.6$, $-0.9<f3/f2<-0.4$, respectively, where f1 represents the focal length of the first lens; f2 represents the focal length of the second lens; and f3 represents the focal length of the third lens.

7. The imaging lens according to claim 1, wherein a conditional expression (9) is satisfied with respect to optical length and the focal length of the entire imaging lens system, the conditional expression (9) being $1.08<L/f<1.23$ where L represents the distance from the front surface of the first lens to an image surface; and f represents the composite focal length of the entire imaging lens system.

8. The imaging lens according to claim 1, wherein the first, second, third and fourth lenses are so-called plastic lenses each having at least one aspherical surface and formed using a resin material.

9. The imaging lens according to claim 1, wherein the object side surface of the second lens has at least one point having a tangent plane perpendicular to the optical axis.

* * * * *